United States Patent
Grainger

[11] Patent Number: 6,099,210
[45] Date of Patent: Aug. 8, 2000

[54] TOOL HOLDER WITH PIVOTAL ADJUSTMENT

[75] Inventor: Jacob S. Grainger, Sherborn, Mass.

[73] Assignee: Alpha Grainger Mfg., Inc., Franklin, Mass.

[21] Appl. No.: 09/192,737

[22] Filed: Nov. 16, 1998

Related U.S. Application Data

[60] Provisional application No. 60/076,625, Mar. 3, 1998.

[51] Int. Cl.$^7$ ..................................................... B23B 27/16
[52] U.S. Cl. ................................. 407/76; 407/77; 407/83; 407/89; 407/110
[58] Field of Search .................................. 407/76, 77, 81, 407/82, 83, 89, 90, 91, 110, 111; 408/156, 157, 162, 180, 181, 185, 187, 714

[56] References Cited

U.S. PATENT DOCUMENTS

| | | | |
|---|---|---|---|
| 3,655,969 | 4/1972 | Pollington et al. | 407/91 X |
| 4,357,123 | 11/1982 | Zweekly | 407/110 |
| 4,428,704 | 1/1984 | Kalokhe | 407/89 X |
| 4,780,029 | 10/1988 | Beck | 407/77 X |
| 4,839,947 | 6/1989 | Cohen et al. | 24/499 |
| 4,887,945 | 12/1989 | Pano | 407/110 |
| 4,938,640 | 7/1990 | Pano et al. | 407/110 |
| 5,267,817 | 12/1993 | Englund | 407/110 |
| 5,361,463 | 11/1994 | Revis | 24/543 |
| 5,516,241 | 5/1996 | Plutschuck et al. | 407/110 |
| 5,743,680 | 4/1998 | Von Haas et al. | 407/19 |

FOREIGN PATENT DOCUMENTS

| | | | |
|---|---|---|---|
| 3637209 | 5/1988 | Germany | 407/76 |

*Primary Examiner*—Henry W. H. Tsai
*Attorney, Agent, or Firm*—Weingarten, Schurgin, Gagnebin & Hayes LLP

[57] ABSTRACT

A tool holder is provided for retaining a cutting tool which can be pivotally adjusted to align the cutting tool and provide a precise cut. The tool holder body has an area of reduced cross-section which serves as a fulcrum about which the cutting tool is pivotable. The tool holder body has a forward tool end for retaining a cutting tool and a rearward end operative to be mounted or retained on a lathe or other machine tool. The forward tool end can be pivotally adjusted about the fulcrum to align the cutting tool and provide an accurate, straight cut into a workpiece. A lever arm attached to the cutting tool end is adjustable to cause pivotal movement of the cutting tool by displacing the tool end laterally in response to the force of the lever arm when it is drawn toward or away from the tool holder body.

10 Claims, 3 Drawing Sheets

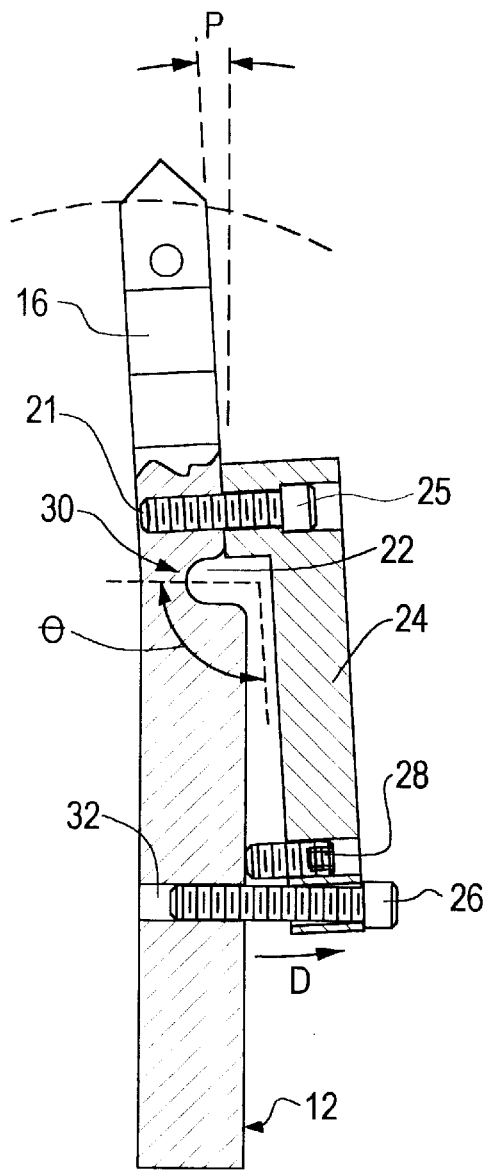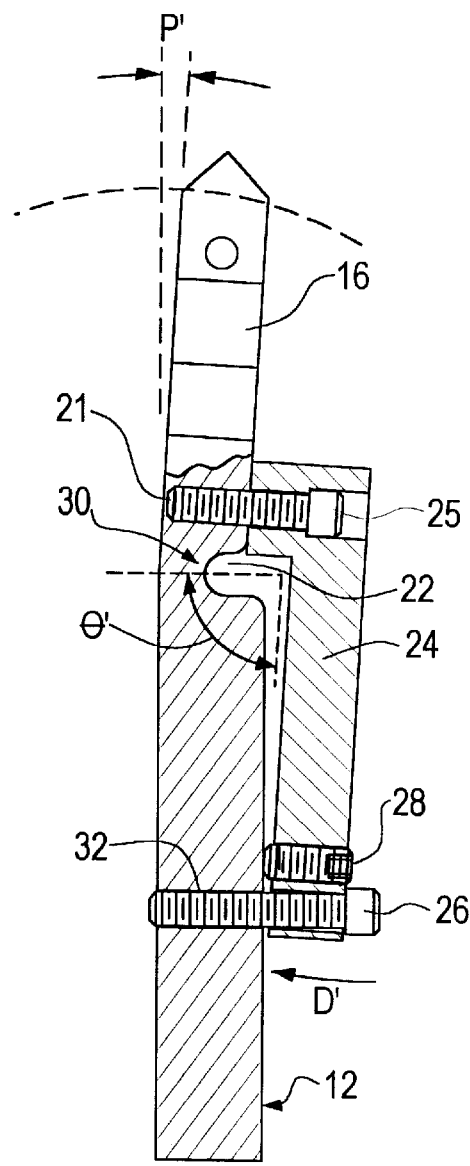
FIG. 2   FIG. 3

TOOL HOLDER WITH PIVOTAL ADJUSTMENT

CROSS REFERENCE TO RELATED APPLICATIONS

This application claims priority to U.S. provisional patent application No. 60/076,625, entitled Tool Holder with Pivot Adjustment, filed Mar. 3, 1998 and incorporated herein by reference.

STATEMENT REGARDING FEDERALLY SPONSORED RESEARCH OR DEVELOPMENT

Not Applicable

BACKGROUND OF THE INVENTION

This invention relates to tool holders and particularly to a pivot adjustment assembly for lateral pivoting of a tool held therein.

A variety of tool holders are known for holding cutting bits and the like for use in machine tools such as lathes and milling machines. The tool holders may take a variety of forms to suit the machine in which they are employed and to accommodate the particular cutting bit or other item to be clamped in the holder. In general, the tool holders comprise a metal body having one or more separate clamping elements fastened to the body by appropriate machine screws or other fasteners and defining a recess or opening into which a tool bit is inserted and locked into position by one or more locking screws or other clamp elements.

Such a tool holder is typically secured by any suitable means to a guide piece such as a rail or slide. The tool holder is then manually disposed or mechanically driven along such a guide into a workpiece. This workpiece is typically rotating or moving at a high rate of speed such that as the cutting bit or other object contacts the workpiece, material is gradually removed or deformed at a controlled rate, thereby allowing a precise formation of a desired pattern or cut in the workpiece. Often, such a tool holder is mounted on a guide apparatus which tends to be difficult to precisely align at the exact cutting angle. This misalignment can cause an unwanted tapering of a resulting cut in the workpiece.

It would therefore be advantageous to have a tool holder which allows a precise, controlled lateral pivoting of the cutting piece to adjust the position of the tool bit to produce an intended cut.

BRIEF SUMMARY OF THE INVENTION

The tool holder in accordance with the present invention comprises a tool holder body having a forward tool end for retaining a cutting tool and a rearward mounting end or section operative to be mounted or retained on a lathe or other machine tool. The forward tool end is pivotally adjustable in a lateral direction to align the cutting tool and provide an accurate, straight cut into a workpiece.

The tool holder body has an area of reduced cross-section which serves as a fulcrum or bend point about which the forward tool end of the holder is pivotable. A lever arm is attached to the forward tool end of the body. An adjusting screw and a clamping screw are provided on the rearward end of the lever arm and are operative to move the lever arm in relation to the tool holder body to cause pivotal movement of the forward tool end. The adjusting screw serves as an adjustable stop. The clamping screw serves to clamp to lock the lever arm in its adjusted position.

BRIEF DESCRIPTION OF THE SEVERAL VIEWS OF THE DRAWING

FIG. 2 is a top view of the pivoting tool holder at a first pivot position;

FIG. 3 is a top view of the pivoting tool holder at a second pivot position;

DETAILED DESCRIPTION OF THE INVENTION

Figure 1:
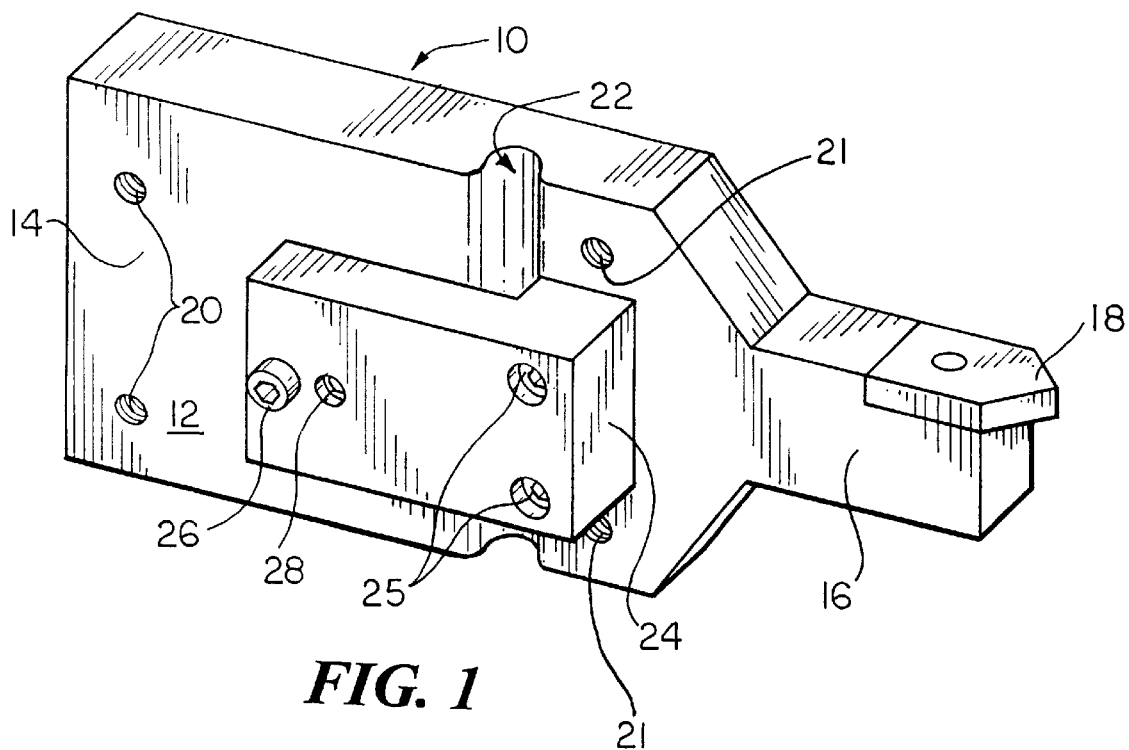
FIG. 1 is a perspective view of a tool holder according to the present invention.

A tool holder 10 in accordance with the present invention is shown in FIGS. 1–3, and has an elongated body 12 of a generally rectangular cross section, a rearward mounting end 14, and a forward tool end 16. The forward end 16 is adapted to retain a cutting bit 18 or other tool in a secure manner such that the bit may be driven into a workpiece (not shown) for removing material from or otherwise deforming the workpiece material.

Such a bit 18 may be attached by any suitable means to the forward tool end 16. In a preferred embodiment, the tool holder body 12 is of integral one piece construction of a suitable metal. The forward tool end 16 can include an integral clamp for clamping and locking a cutting tool in place. Such an integral clamping feature is the subject of copending application serial number 08/944,264, entitled Tool Holder, filed Oct. 6, 1997.

The tool holder body 12 can be configured to be mounted on an associated machine tool (not shown) and can have openings and other mounting features appropriate for attachment to the machine tool with which the holder is to be employed. In the embodiment shown, the rearward mounting end 14 has various apertures 20 and/or slots adaptable to attach the tool holder 10 to a guide piece or machine with which the tool holder 10 is to be used, thereby allowing for precise, controlled movement of the tool holder 10 in relation to a workpiece.

The tool holder body has a cutaway area of reduced cross section 22 for permitting lateral pivoting movement of the forward tool end 16. Such a tool holder body 12 is typically composed of a suitable metal sufficiently rigid to support the cutting bit 18, yet slightly deformable to permit pivoting without cracking from fatigue. A lever arm 24 is mounted to the tool holder body by mounting screws 25 which are threaded into tapped mounting holes 21 which are disposed forward of the area 22 of reduced cross section. The lever arm is spaced from the confronting surface of the body and extends rearwardly as illustrated. A clamping screw 26 is provided at the rear end of the lever arm. This screw 26 extends through a hole in the rear end of the body and is threaded into a tapped hole 32 in the body 10. An adjustment screw 28 is threaded into a tapped hole in the arm 24 and bears against the facing surface of the body.

The clamping screw 26 and adjusting screw 28 are employed to adjust lever arm 24 toward and away from the tool holder body to cause pivotal movement of the tool end 16. As shown in FIGS. 2 and 3, movement of the clamping screw 26 and adjusting screw 28 changes the angle of deflection $\theta$, $\theta'$ of lever arm 24, which is transmitted to the forward tool end 16 to effect pivotal movement by slightly warping the tool holder body 12 about a bend point 30. Referring to FIG. 2, adjusting screw 28 is shown drawing lever arm 24 to the outermost travel distance D away from tool holder body 12, thereby disposing lever arm at deflection angle $\theta$. Clamping screw 26 is threaded in to lock the lever arm in position. In FIG. 3, adjusting screw 28 is shown drawing lever arm 24 to a minimal distance D' from the tool holder body 12 and disposing lever arm 24 at deflection angle θ'. The clamping screw 26 is threaded inward to lock the lever arm in place.

In FIGS. 2 and 3, the pivot angle is shown exaggerated for clarity, as the actual deflection distance at the tool end in a preferred embodiment is typically in the range of 40 to 50 mils on either side of a center line of the body. This pivot deflection range can be varied, however, depending on the rigidity of material chosen for the tool holder body and the tensile strength required of such a tool holder.

In the preferred embodiment, clamping screw 26 is rotated in tapped hole 32, to clamp or lock lever arm 24 at an angle of deflection θ relative to tool holder body 12, as determined by adjusting screw 28 which is rotated to define a precise limit of movement thereby fixing the angle of deflection θ, θ' and the resultant pivot angle P, P' respectively. Other means of disposing lever arm 24 relative to tool holder body 12 can be provided to cause pivotal movement of the forward tool end 16.

Figure 4:
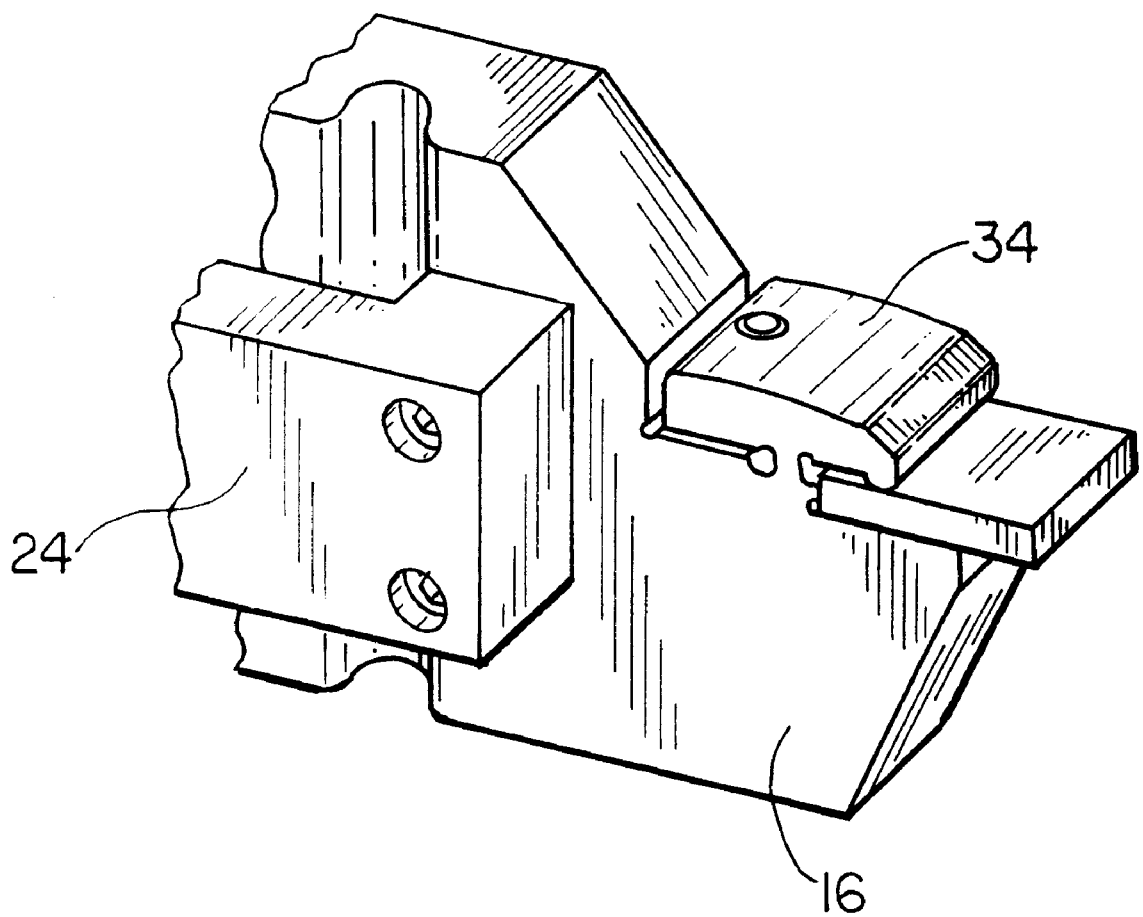
FIG. 4 is a cutaway perspective view of an alternative embodiment of the tool holder.

An alternative embodiment of the tool holder body is shown in FIG. 4, in which the forward tool end 16 includes an integral clamp 34 for attaching and clamping a cutting tool, as disclosed in the above-noted copending U.S. patent application 08/944,264. The lever arm is operative in the same manner as described above to pivotally adjust the tool end.

As various alternatives and modifications to the above embodiments may be apparent to those skilled in the art, the present invention as described herein is not intended to be limited except as defined by the following claims.

What is claimed is:

1. A tool holder comprising:
    an elongated body having a forward end and a rearward mounting end;
    an area of reduced cross-section between said forward end and said rearward mounting end which is operative as a fulcrum about which the forward end can bidirectionally pivot in relation to said rearward mounting end;
    a lever arm attached to said forward end, bridging said area of reduced cross-section and extending along and spaced from at least a portion of said rearward mounting end; and
    an adjustment mechanism on the lever arm adjustably engaging a rearward end of the lever arm at a location spaced from said fulcrum and operative to deflect the forward end of the elongated body about the area of reduced cross-section to pivotally adjust the position of the forward end.

2. The tool holder of claim 1 wherein said forward end further comprises a tool bit receptacle adapted to detachably receive a tool bit.

3. The tool holder of claim 1 wherein said forward end further comprises a tool bit receptacle adapted to detachably receive a cutting tool bit.

4. The tool holder of claim 2 wherein said tool bit receptacle includes an integral clamp.

5. The tool holder of claim 4 wherein said integral clamp and said elongated body are comprised of a monolithic member.

6. The tool holder of claim 1 wherein the adjustment mechanism includes at least one threadably adjustable element for causing deflection of the elongated body.

7. The tool holder of claim 6 wherein the threadably adjustable element includes at least one clamping screw disposed through a hole in the rearward end of the lever arm and threadably rotatable in a clamping screw hole in the elongated body.

8. The tool holder of claim 7 further comprising at least one adjusting screw threadably attached to said lever arm, said adjusting screw extending through said lever arm and disposed to contact with the body to cause deflection of the elongated body.

9. The tool holder of claim 1 wherein said area of reduced cross-section further comprises a groove in said elongated body between said forward end and the rearward mounting end.

10. A tool holder comprising:
    an elongated body having a forward end and rearward mounting end;
    an area of reduced cross-section between said forward end and said rearward mounting end extending across said elongated body along a line substantially perpendicular to the longitudinal direction of said elongated body and between said forward end and said rearward mounting end, and which is operative as a fulcrum about which said forward end can bidirectionally pivot relative to said rearward mounting end;
    a lever arm having a mounting end attached to the elongated body at a position forward of the area of reduced cross-section, bridging said area of reduced cross-section and having a section spaced from and extending toward the rearward mounting end of the elongated body;
    an adjustment mechanism coupling the section of the lever arm to the elongated body and operative to deflect the forward end of the elongated body laterally about the area of reduced cross-section to cause pivotal adjustment of the forward end of the body.

* * * * *